March 24, 1964
L. J. KMIECIK
3,126,463
FLUID RESPONSIVE CONTROL DEVICES
Filed Feb. 16, 1961
3 Sheets-Sheet 1
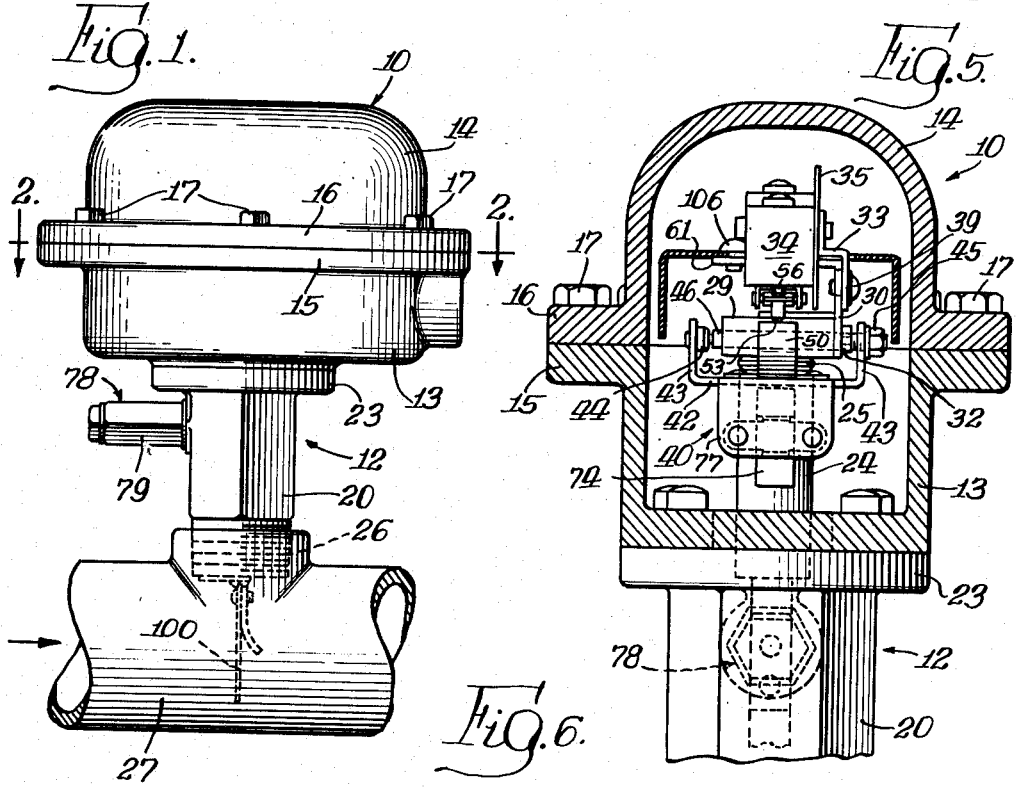
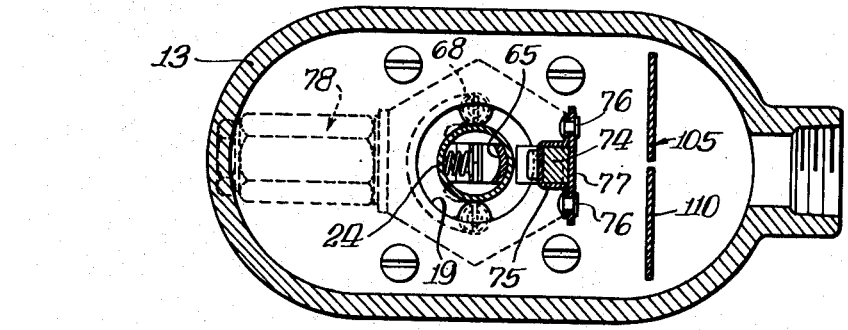
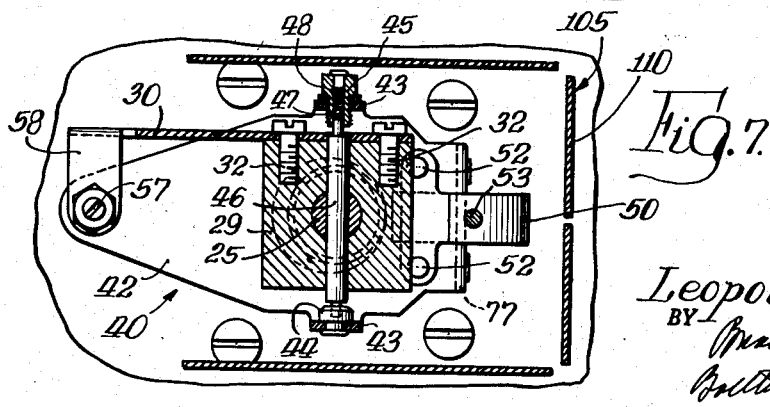
INVENTOR.
Leopold J. Kmiecik,
BY
Atty's.

March 24, 1964
L. J. KMIECIK
3,126,463
FLUID RESPONSIVE CONTROL DEVICES
Filed Feb. 16, 1961
3 Sheets-Sheet 2
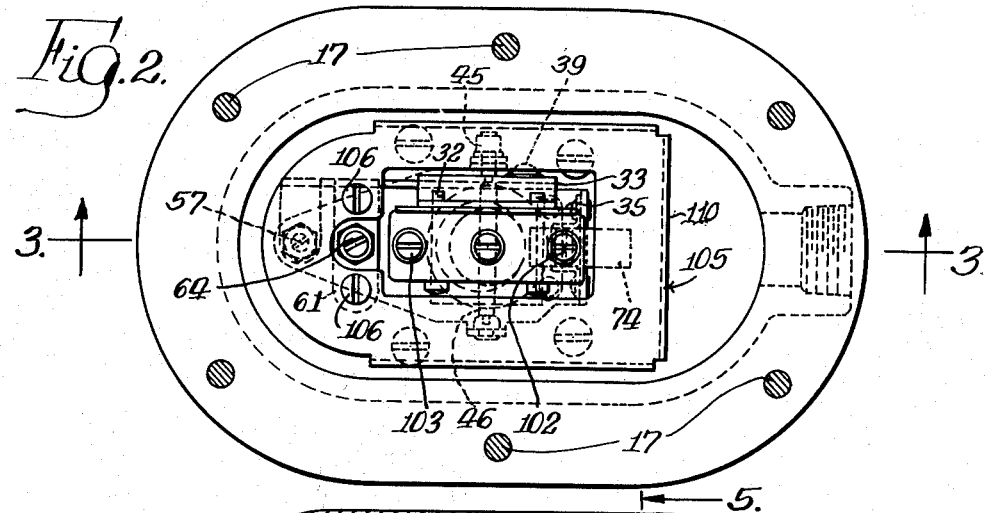
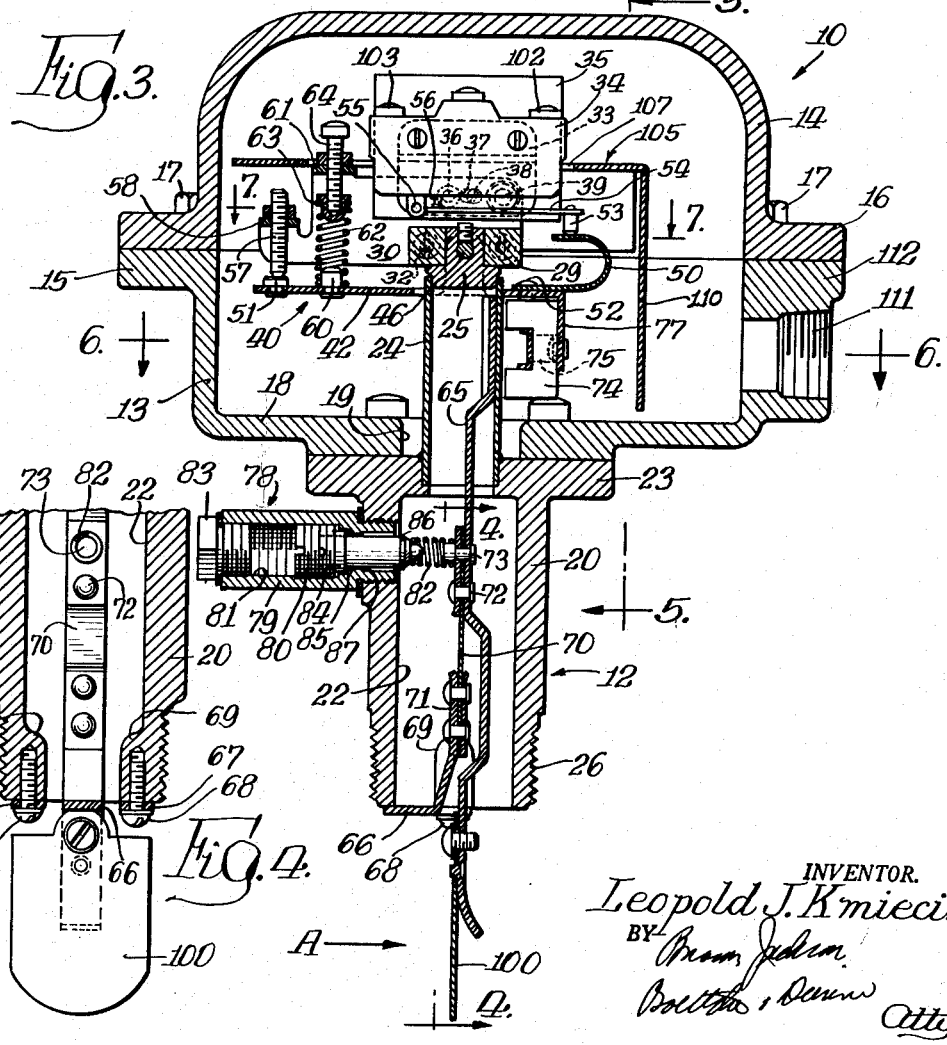
INVENTOR.
Leopold J. Kmiecik,
BY
Att'ys

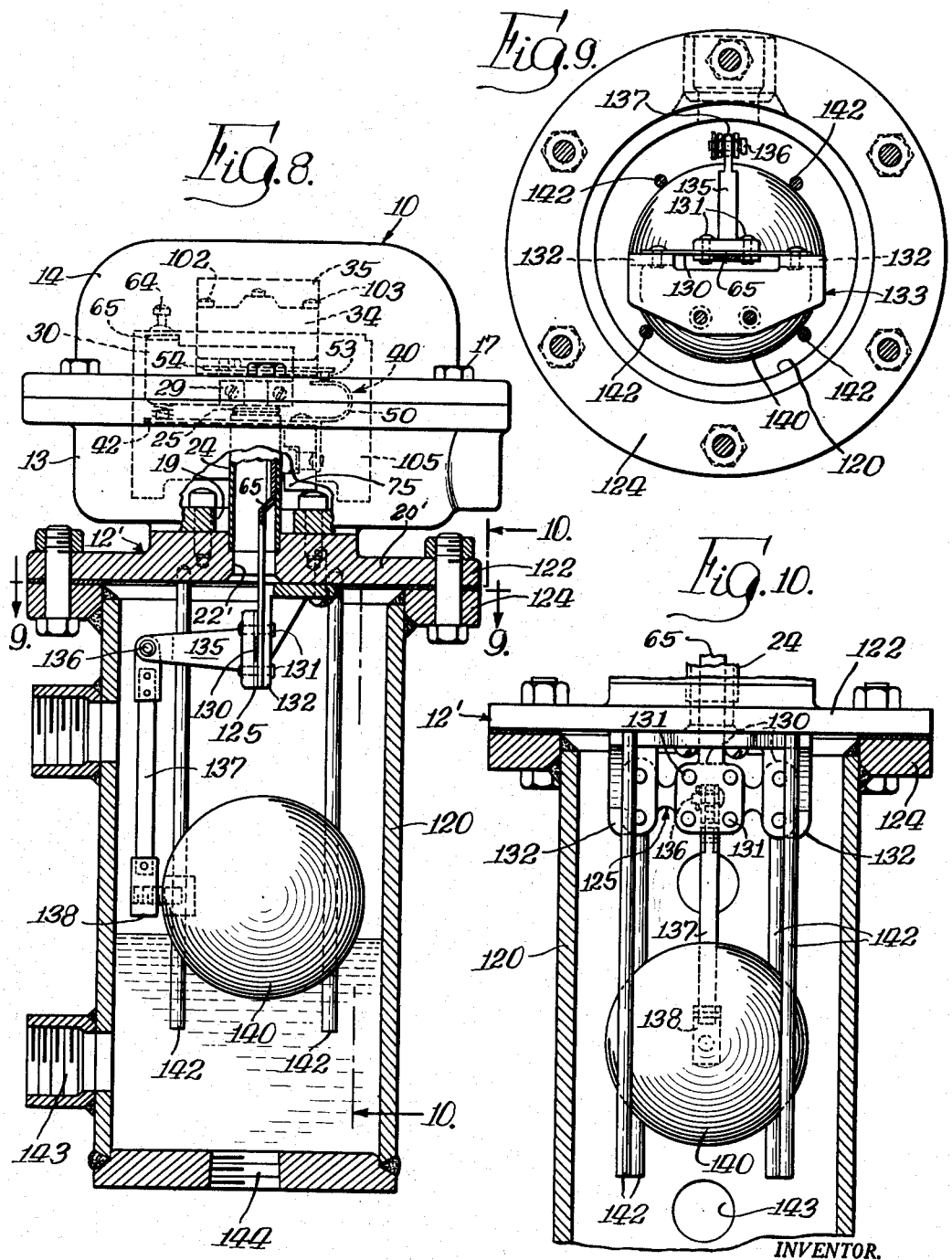

United States Patent Office 3,126,463
Patented Mar. 24, 1964

3,126,463
FLUID RESPONSIVE CONTROL DEVICES
Leopold J. Kmiecik, Lincolnwood, Ill., assignor to McDonnell & Miller, Inc., Chicago, Ill., a corporation of Delaware
Filed Feb. 16, 1961, Ser. No. 89,851
12 Claims. (Cl. 200—81.9)

My present invention relates to improvements in control devices, and more particularly to control devices responsive, for example, to flow of liquid in a pipe line or the like or to the level of liquid in a float chamber.

In the sensing of liquid flow or liquid level conditions in many industrial applications, it is desirable, and under certain circumstances essential, to provide a high degree of sensitivity in effecting the actuation of switch means in response to changes in conditions of the character indicated. Many of the prior devices of the character to which my present invention relates are ineffective in the respects noted and others, suitable for the purpose, are complicated and expensive constructions. Further, in many installations, the control devices should be so-called explosion proof so as to avoid or obviate the dangers and prevent the serious consequences of devices that are not so characterized.

My present invention is directed in its general aspects to devices, particularly meeting the aforementioned requirements, and an important object of my invention is to provide devices of the character indicated which are of simple and economic construction.

A further object of my invention is to provide a control device of the class indicated embodying a housing enclosing switch means adapted to be tripped upon the occurrence of a predetermined condition, such as liquid flow or lack of liquid flow in a pipe line, or the raising or lowering of the liquid level in a float chamber, a base assembly for the housing, switch actuating means including components arranged in the base assembly and housing, and in which the base assembly is mounted on the housing to prevent the liquid to which the device is responsive from entering the housing.

A further object of my invention is to provide a device as last noted in which the housing encloses all components which are readily subject to damage or which may be deleteriously affected by the liquid to which the device is responsive.

A further object of my invention is to provide a device as last noted in which spring means is incorporated in the housing to effect movement of the switch actuating means for tripping the aforementioned switch means.

A further object is to provide a device as last noted in which in the event fracture or disability of the last mentioned spring means, the device fails safe.

A further object is to provide electrical terminal means for the switch means in the housing and in which an enclosure is provided within the housing to protect the switch means and the components of the switch actuating means in the housing to prevent accidental disruption of such components.

A further object is to provide a device of the class indicated including a housing and base assembly in which the base assembly includes a tubular member closed at its inner end extending into the housing, and open at its lower end, and in which tubular member, an operating member of the switch actuating means, is supported for relative movement in effecting tripping of the switch means in the housing.

A further object is to provide a device as last noted in which the operating member comprises an armature, and the components of the switch actuating means within the housing include a permanent magnet arranged with respect to the inner end of the armature to control actuation of the switch means in the housing.

A further object of my invention is to provide a device as last noted in which the outer end of the armature carries a paddle member adapted to be subjected to the flow or lack of flow of fluid in a pipe line and consequent actuation of the switch means in the housing by the switch actuating means.

A further object of my invention is to provide a control device in which the aforementioned operating member in the tubular member of the base assembly has suitable connection with a float in a float chamber to effect actuation of the switch actuating means and of the switch in the switch housing in response to the liquid level in the float chamber for the float.

It is a further object of my invention to provide control devices as aforesaid in which the tubular member of the base assembly provides for the support of the components of the switch actuating means within the housing, the switch means in the housing, and the spring means for effecting movement of the switch actuating means.

A further object of my invention is to provide control devices as last indicated in which the several aforementioned components within the housing are enclosed within a closure cover to prevent accidental disruption of such components.

A further object of my invention is to provide convenient eccentric means for adjusting the position of the switch means relative to the switch actuating means.

A further object of my invention is to provide pivot means for supporting the operating member or armature to extend lengthwise of the tubular member of the base assembly, and which pivot means in a preferred form of my invention comprises a spring to provide for the transverse movement of the inner end of the operating member or armature transversely of the tubular member of the base assembly.

The above and other objects and advantages of my invention will appear from the following detailed description of certain preferred embodiments of my invention.

Now in order to acquaint those skilled in the art with the manner of constructing and utilizing devices embodying the principles of my present invention, I shall describe in connection with the accompanying drawings, certain preferred embodiments of my invention.

In the drawings:

FIGURE 1 is a side elevational view of a control device in the form of a flow switch constructed in accordance with the principles of my present invention;

FIGURE 2 is a plan view of the device of FIGURE 1 with the upper cover of the housing removed and with the view being taken substantially along the line 2—2 looking in the direction indicated by the arrows;

FIGURE 3 is a vertical sectional view taken substantially along the line 3—3 of FIGURE 2 looking in the direction indicated by the arrows;

FIGURE 4 is a detail vertical sectional view taken substantially along the line 4—4 of FIGURE 3 looking in the direction indicated by the arrows;

FIGURE 5 is a vertical sectional view taken substantially along the line 5—5 of FIGURE 3 looking in the direction indicated by the arrows;

FIGURE 6 is a horizontal sectional view taken substantially along the line 6—6 of FIGURE 3 looking in the direction indicated by the arrows;

FIGURE 7 is a detail horizontal sectional view taken along the line 7—7 of FIGURE 3 looking in the direction indicated by the arrows;

FIGURE 8 is a vertical sectional view of another control device in the form of a float switch constructed in accordance with the principles of my present invention;

FIGURE 9 is a horizontal sectional view taken substantially along the line 9—9 of FIGURE 8 looking in the direction indicated by the arrows; and FIGURE 10 is a detail vertical sectional view taken substantially along the line 10—10 of FIGURE 8 looking in the direction indicated by the arrows.

Referring now to FIGURES 1 through 7 of the drawings, I have shown my present invention embodied in a control device in the form of a flow switch comprising a main housing 10 and a base assembly 12 mounted at the bottom of housing 10. The housing 10 comprises a cup-shaped bottom or body part 13 and a cup-shaped upper housing or cover part 14 having flanges 15 and 16, respectively, at their opened opposed ends which are joined in the conventional manner as by bolts 17 or the like, to provide an enclosure for certain components of the control device. The body part 13 of the housing has its bottom wall 18 formed with an opening 19, and the base assembly 12 comprises a base member 20 having an opening or passageway 22 extending therethrough, and a flange 23 which is mounted to the bottom wall 18 surrounding opening 19. A hollow tubular member 24, preferably of non-magnetic stainless steel, is mounted in fluid tight relation at its lower end in a recess in the base member 20 to extend inwardly of the housing 10 through the opening 19 in bottom wall 18, and the tubular member 24 at its inner end is closed in any suitable manner as by means of a plug 25 secured thereto in liquid tight relation. The base member 20, as shown, may be suitably threaded as at 26 at its lower or outer end portion to provide for threaded assembly of the device in a pipe line 27 to be responsive to flow or lack of flow of liquid in the pipe line. In the arrangement of the device in the manner described, it will be observed from FIGURES 1 and 3 that liquid flowing in pipe 27 may enter passageway 22 of the base member 20 and into the interior of tubular member 24, but that the arrangement of the base assembly is such that plug 25 prevents entry of such liquid into the main housing 10.

The tubular member 24 and inner end plug 25 provide for the support of the several components of the control device located within the housing 10. To this end, as best seen in FIGURES 3 and 7, the plug 25 has a square collar 29 secured thereto and to the one side of which a supporting bracket 30 is secured as by a pair of bolts 32. As best seen in FIGURE 5, an adjustable switch supporting angle plate 33 has a flange thereof mounted to the vertical planar portion of bracket 30 and an offset second flange has switch means indicated at 34 secured thereto. The switch 34 may be of any suitable known construction and in the embodiment illustrated is a conventional micro-switch. An insulator shield 35 is preferably mounted between the body or casing of the switch and the offset flange of switch supporting plate 33. As best seen in FIGURE 3, the switch supporting plate 33 is pivotally mounted as at 36 on bracket 30, and an elongated slot 37 and adjusting pin 38 is arranged between the bracket 33 and plate 30 to provide for adjustment of switch supporting plate 33 relative to the supporting bracket 30. A conventional lock or set screw 39 is arranged between the switch supporting plate 33 and the supporting bracket 30 to retain the switch 34 in its adjusted position. In the arrangement of components thus far described, it will be observed that the switch 34 is disposed above the inner closed end of the tubular member 24 in position to be tripped by switch actuating means generally indicated in FIGURES 3, 5 and 7 at 40, certain components of which are arranged between switch means 34 and the inner end portion of tubular member 24 of the base assembly. The switch actuating means 40, as best seen in the last mentioned figures includes a plate member 42 having integral upwardly extending lugs 43 at the opposite sides thereof in which end bearing cap members 44 and 45 are mounted for receiving the reduced ends of a pivot pin 46 which extends through the collar 29 and the upper end portion of plug 25 to provide for support of the plate member 42 for pivotal movement intermediate its ends and on a horizontal axis above the closed end of tubular member 24. The bearing cap 45 as best seen in FIGURE 7 is formed with a bore in which a ball bearing 47 is arranged at the adjacent reduced end portion of pivot pin 46. A spring 48 in the bore of cap 45 bears against the ball bearing 47 and the spring is maintained under compression by means of a pin fitted into and peened over at its outer ends in bearing cap 45 so as to resiliently hold pivot pin 46 against end play and yet provide freedom of movement of pivot axis for plate member 42. The plate member 42 at one end thereof has a spring member 50, in the form of a substantially U-shaped leaf spring member, secured thereto as by rivets 52. The spring 50 is positioned so that its free end is adapted to engage a stem 53 at the outer end of switch or trip arm 54 for switch 34. The switch arm 54 is pivoted adjacent its opposite end at 55 on the switch housing and a plunger 56 extends from the switch housing adjacent the pivot 55 so that upon upward movement of the outer end of switch arm 54 overlying spring 50, the switch arm 54 pivots in a direction to depress the plunger 56 and in turn trip the switch.

The plate member 42 of switch actuating means 40 at its end opposite spring 50 carries spring seat member 60 for one end of a spring 62, the other end of which seats against a cup washer 63 disposed at the inner end of a bolt 64. The bolt 64 is threadedly mounted in a horizontally extending flange 61 of the supporting bracket 30, as shown, and is retained against rotation by a conventional lock nut. Adjustment of bolt 64 provides for the adjustable loading of coil spring 62 for biasing plate member 42 in a direction to engage spring 50 with the stem 53 of switch member 54 and thus effect inward movement of operating plunger 56 of the switch means 34.

The plate member 42 at its end opposite the end at which spring 50 is mounted is provided with an abutment member 51 adapted to engage the inner end of an adjustable bolt 57 threaded in flange 58 of supporting plate 30. The bolt 57 is retained in adjusted position by a conventional lock nut as shown. Adjustment of bolt 57 provides for limiting of plate member 42 in a clockwise direction as viewed in FIGURE 3 for a purpose to be described below in connection with operation of the device.

Switch actuating means 40 further comprises an operating member 65, which in the embodiment of the invention herein described, comprises an armature which extends lengthwise of and within the base assembly 12 and has its inner end disposed adjacent the closed end of tubular member 24. The armature 65, as best seen in FIGURE 3 is mounted in its position aforedescribed by means of a bracket 66 formed with side lugs or ears 67 secured by bolts 68 threaded into internal boss portions 69 inwardly of the open end of the base member 20. A flat leaf spring 70 is secured at one end to leg 71 of bracket 66 extending inwardly of opening 22 of base member 20. The spring 70 is secured at its other or upper end to armature 65 intermediate the ends of the latter as by means of a pair of rivets 72 and 73. The leaf spring 70 provides an intermediate pivot for the armature 65 so that its inner end is free to move transversely of the tubular member 24. The switch actuating means 40 further comprises a permanent magnet 74 supported by a bracket 75 fixed at its opposite ends as by rivets 76 to a depending flange 77 of plate member 42 below spring 50. The magnet 74 is thus disposed outwardly of the inner end of tubular member 24 and opposite the inner end of armature 65.

The base assembly 12 may also include adjustment means indicated generally at 78 comprising a housing 79 in which a paddle adjustment screw 80 has threaded engagement with internal threads 81 of the housing member 79. A coil spring 82 extends between the inner projecting end of adjustment screw 80 and seats against armature 65 around a pilot portion of rivet 73. The housing 79 is closed by a cap screw 83 which is removable for adjusting the position of adjustment screw 80. The adjustment screw 80 projects through a packing gland nut 84 at the inner end of internal threads 81 into tight sealing engagement with an O ring 85 to form a seal and prevent fluid from the interior of base assembly from escaping through housing 79. Also, a snap ring 86 is mounted adjacent the inner end of adjustment screw 80 for engaging a shoulder 87 inwardly of the inner end of housing 79 so as to prevent withdrawal of adjustment screw through the housing after assembly of the device at the factory. The armature 65 at its free outer projecting end carries or has fixed thereto a paddle 100 which is adapted to be disposed in the stream of flow of liquid in a pipe line and is sensitive to movement or lack of movement of the liquid in the pipe line.

The aforesaid parts thus provide for adjustment of the force applied by coil spring 82 to armature 65 in opposition to the force applied to paddle 100 upon movement of fluid from left to right as viewed in FIGURE 3 of the drawings and as indicated by the arrow A. The adjustment means 78 thus permits adjusting the force of fluid flow necessary to move armature 65 about its pivot afforded by spring 70 and move its inner end in a counter clockwise direction as viewed in FIGURE 3.

The switch means 34 previously described is provided at its upper end with a pair of terminal screws 102 and 103 to which the wires of a suitable electrical lead may be connected and which lead extends to other central or signal means which are to be energized or de-energized depending upon the flow or lack of flow of liquid in the pipe line. Within housing 10 there is also arranged cover means or a closure 105 of substantially box-like shape having its upper wall mounted on the horizontal flange 61 of support plate 30 by a pair of screws 106. The cover means is open at its bottom and is suitably formed to enclose the several components within the housing 10. It is formed with an opening 107 in its upper wall through which the switch 34, the insulator shield 35 and upper flange end of bracket 33 extend. The cover means 105 otherwise encloses all other components and as will be noted has a closed end wall 110 adjacent the threaded or tapped opening 111 formed in side wall 112 of the bottom housing part 13. Thus, an electrical lead may be extended into the housing 10 through the opening 111 for connection with terminals 102 and 103 of the switch 34, and the closed end wall 110 prevents the accidental ramming of the electrical lead into the component parts above described of the switch actuating means and the switch itself to prevent damage to any of the operating parts within the housing 10.

With the control device mounted in its operating position in pipe line 27 as shown in FIGURE 1, and assuming flow of fluid through the pipe line is from the left to the right, as indicated by the arrows applied to FIGURES 1 and 3, it will be seen that if such fluid flow acting against paddle 100 is sufficient to cause transverse movement of the inner end of the armature 65 in a direction away from permanent magnet 74 that coil spring 62 will overcome the attraction of the weakened magnetic field between the armature and the magnet and cause plate member 42 of switch actuating means 40 to rotate in a counter-clockwise direction as viewed in FIGURE 3. The spring 50 with the force of coil spring 62 applied thereto and acting on stem 53 of switch arm 54 effects pivotal movement of the latter and forces plunger 56 inwardly of the switch and thus trips the switch 34. Depending upon the use to which the control device is to be put, the aforementioned actuation of switch 34 may be either to open or close a circuit dependent upon the nature of the secondary apparatus controlled by the switch. Upon change of condition of fluid flow in the pipe line enabling the inner end of armature 65 to assume a position close to the inner wall of tubular member 24 opposite permanent magnet 74, the magnet 74 will be attracted to the latter rotating the plate member 42 in a clockwise direction and loading spring 62 to condition it for its succeeding operation. Such movement of plate member 42, of course, withdraws the switch tripping force of the spring portion 50 from switch arm 54 and the plunger 56 returns to its outer position and effects the appropriate switching operating and control of the circuit through the electric leads connected to the switch terminals. The abutment member 51 of plate member 42 engages the inner end of adjustment screw 57 to arrest movement of the plate member 42 and to dispose magnet 74 in predetermined minimum position with respect to the inner end of armature and also prevents engagement of the magnet with the outer surface of tubular member 24.

In the device aforedescribed, it is desirable that the components of the switch actuating means 40 such as the armature or operating member 65 and paddle 100 and other component parts to be fabricated of materials resistant to corrosion or damage by the liquid flowing in the pipe line. In that the base assembly, including the tubular member 24 and its closure at its inner end, prevents the admission of fluid from the pipe line to the housing 10, the various component parts of the assembly within the housing 10 may be fabricated of materials which need not be corrosion resistant.

It will be observed in the event spring means 62 should break or fracture, the parts of the switch actuating means 40 within the housing 10 will remain in the position shown in FIGURE 3 of the drawings and such position should constitute a safe fail position for the device. To this end the magnet 74 should be of sufficient mass so that with spring means 62 disabled the plate member 42 will be caused to be rotated to the position of FIGURE 3. Also, since the coil spring 62 is maintained under compression, it will have long life and not be subject to ready change in its biasing force value so that such spring means when once adjusted will remain so for a long period of time.

Upon reference now to FIGURES 8 through 10, I have shown another form of control device of my invention devised to be responsive to the liquid level within a float chamber or the like. The control device includes a main housing which is the same in all respects as the main housing 10 of the embodiment first described. Further, all components within the main housing are identical to the previously described components therein and all such parts are indicated by the same reference numerals so that the description of such parts or components is not necessary for an understanding of the control device of FIGURES 8 through 10.

In the device of FIGURES 8 through 10, it will be seen that the base assembly 12' has been modified to adapt it for connection with a float chamber 120 and for such purposes the base member 20' includes an enlarged annular flange 122 in lieu of the threaded end portion 26 of the first form of control device first above described, which is adapted to be mounted to an upper annular flange 124 of the float chamber. As before, base member 12' has an opening 22' extending therethrough and into which the outer end of tubular member 24 of the base assembly is seated and has fluid tight connection to the end of preventing liquid in the float chamber from entering the main housing 10.

Also, with respect to operating member or armature 65, it will be seen that the paddle 100 of the first embodiment of my invention above described has been removed and another form of spring means 125, in lieu of spring means 70 is employed for the pivotal mounting of the operating member or armature 65. In regard to the spring means 125, it will be observed that it includes an intermediate flexible portion 130 connected by rivets 131 to the lower or outer end portion of armature 65.

The spring 125 at its opposite ends is securely fastened in the depending ends 132 of a bracket 133 secured to the bottom surface of base member 20' below the opening 22'. The opposite end portions of the springs are thus held against movement, but the inner portion is adapted to flex or twist in accord with the principle of a torsion bar so as to effect the movement of the inner end portion of the armature 65 adjacent the closed end of tubular member 24 for movement transversely of the latter. To this end an arm 135 has connection to the intermediate portion of the leaf spring member 125 and at its outer end has pivotal connection at 136 to the depending vertical rod 137 which in turn has connection through a fitting 138 to a float 140. A plurality of guide rods 142 depend downwardly from base member 122, preferably four in number, to provide a guideway for the vertical upward and downward movement of the float 140. The float chamber has suitable connections 143 and 144 for the admission and withdrawal of liquid to and from the float chamber. The float 140 may be of the usual and conventional construction and is buoyant in the liquid within the float chamber. The vertical upward and downward movement of the float 140 is guided by the guide rods 142. Thus, upon lowering of the liquid level in the float chamber from the position shown in FIGURE 8, the float 140 will drop vertically carrying with it rod 137 and exerting a turning force through bracket 135 through pivotal connection 136 tending to flex the intermediate portion of leaf spring 125 in a counter clockwise direction as viewed in FIGURE 8 and causing the inner end of operating member or armature 65 to move transversely within the tubular member 24 and in a direction away from the permanent magnet 75 so that spring means 62 effects movement of plate member 42 to trip switch 34 as already described. When the desired predetermined liquid level is again present in the float chamber, the float 140 will rise causing the armature or operating member 65 to return to the position shown in the drawings.

It will be readily understood that various modifications and rearrangements may be made in the aforedescribed control devices and applied to devices of like or similar character wtihout departing from the spirit and scope of my invention.

I claim:

1. In a device for association with a liquid receptacle the combination of a housing comprising a main body part and a removable cover part, said main body part having an opening in the wall thereof, and a base assembly comprising a base member and a non-magnetic tubular member open at one end and closed at its other end, said base assembly being mounted on said wall of said main body part to close the opening therein and with the closed end of said tubular member extending into said housing, said base member being adapted to provide for mounting of said housing on said receptacle to prevent liquid in said receptacle from entering said main body part, switch means mounted in said housing, switch actuating means for actuating said switch means comprising an armature extending lengthwise of said tubular member with its inner end adjacent the closed end of said tubular member and its outer end extending outwardly of the open end of said tubular member, a switch tripping member pivotally mounted intermediate its ends in said housing, and a magnet carried at one end of said switch tripping member and disposed externally of the closed end of said tubular member and opposite the inner end of said armature, means pivotally connecting said armature to said base assembly to provide for movement of said inner end of said armature transversely of the lengthwise axis of said tubular member, means engaging the other end of said switch tripping member for normally biasing the same in a direction to move said magnet away from the inner end of said armature, and said last named means upon movement of the inner end of said armature in a direction away from said magnet effecting movement of said switch tripping member to trip said switch means.

2. In a device for association with a liquid receptacle the combination of a housing comprising a main body part, said main body part having an opening in the wall thereof, and a base assembly comprising a base member and a non-magnetic tubular member open at one end and closed at its other end, said base assembly being mounted on said wall of said main body part to close the opening therein and with the closed end of said tubular member extending into said housing, said base member being adapted tto provide for mounting of said housing on said receptacle to prevent liquid in said receptacle from entering said main body part, switch means mounted in said housing, switch actuating means for actuating said switch means comprising an armature extending lengthwise of said tubular member with its inner end adjacent the closed end of said tubular member and its outer end extending outwardly of the open end of said tubular member, a switch tripping member pivotally mounted intermediate its ends in said housing, and a magnet carried at one end of said switch tripping member and disposed externally of the closed end of said tubular member and opposite the inner end of said armature, spring means pivotally connecting said armature to said base assembly to provide for movement of said inner end of said armature transversely of the lengthwise axis of said tubular member, means engaging the other end of said switch tripping member for normally biasing the same in a direction to move said magnet away from the inner end of said armature, said last named means upon movement of the inner end of said armature in a direction away from said magnet effecting movement of said switch tripping member to trip said switch means, and a removable cover part for said main body part of said housing providing access to said switch means, said switch tripping member and said magnet in said main body part.

3. The combination of claim 2 characterized by the provision of means in said housing for adjusting the position of said switch means relative to said switch tripping member.

4. In a device of the class described the combination of a housing having an opening in a wall thereof, a base assembly comprising a non-magnetic tubular member open at one end and closed at its other end, said base assembly being mounted on said wall of said housing to close the opening therein and with the closed end of said tubular member extending into said housing, switch actuating means including an armature extending lengthwise of said tubular member with its inner end and outer ends being disposed inwardly and outwardly of the open end of said tubular member, respectively, spring means pivotally connecting said armature to said base assembly to provide for movement of said inner end of said armature transversely of said tubular member, switch means mounted within said housing in spaced relation to the closed end of said tubular member, said switch actuating means including a plate member for tripping said switch means pivotally mounted in said housing and having a magnet mounted thereon externally of said tubular member opposite the inner end of said armature and above the opening in said wall of said housing, means for normally biasing said plate member in a direction to move said magnet away from said armature, and said last named means upon movement of the inner end of said armature in a direction away from said magnet effecting movement of said plate member to trip said switch means.

5. In a device of the class described the combination of a housing having an opening in a wall thereof, a base assembly comprising a non-magnetic tubular member opened at one end and closed at its other end, said base assembly being mounted on said wall of said housing to close the opening therein and with the closed end of said tubular member extending into said housing, switch actuating means including an armature extending lengthwise of said tubular member with its inner and outer ends being disposed inwardly and outwardly of the open end of said tubular member, respectively, spring means pivotally connecting said armature to said base assembly to provide for movement of said inner end of said armature transversely of said tubular member, switch means including tripping means and electrical terminal means mounted within said housing in spaced relation to the closed end of said tubular member, said switch actuating means including a plate member for tripping said tripping means of said switch means pivotally mounted in said housing and having a magnet mounted thereon externally of said tubular member opposite the inner end of said armature and above the opening in said wall of said housing, spring means for normally biasing said plate member in a direction to move said magnet away from said armature, said last named spring means upon movement of the inner end of said armature in a direction away from said magnet effecting movement of said plate member to trip said tripping means of said switch means, cover means mounted on said housing for enclosing said plate member of said switch actuating means, said spring means and said tripping means of said switch means, and said cover means having an opening through which said electrical terminal means of said switch means extends.

6. In a device of the class described the combination of a housing having an opening in a wall thereof, a base assembly comprising a non-magnetic tubular member open at one end and closed at its other end, said base assembly being mounted on said wall of said housing to close the opening therein and with the closed end of said tubular member extending into said housing, switch actuating means including an armature extending lengthwise of said tubular member with its inner and outer ends being disposed inwardly and outwardly of the open end of said tubular member, respectively, spring means pivotally connecting said armature to said base assembly to provide for movement of said inner end of said armature transversely of said tubular member, switch means mounted within said housing in spaced relation to the closed end of said tubular member, said switch actuating means including a plate member between said closed end of said tubular member and said switch means for tripping said switch means pivotally mounted in said housing and having a magnet mounted thereon externally of said tubular member opposite the inner end of said armature and above the opening in said wall of said housing, and means for normally biasing said plate member in a direction to move said magnet away from said armature, and said last named means upon movement of the inner end of said armature in a direction away from said magnet effecting movement of said plate member to trip said switch means.

7. In a device of the class described the combination of a housing having an opening in a wall thereof, a base assembly comprising a base member having a passageway extending therethrough, and a non-magnetic tubular member open at one end and closed at its other end and having its open end communicating with the passageway of said base member, said base assembly being mounted on said wall of said housing to close the opening in the latter and with the closed end of said tubular member extending into said housing, switch actuating means including an armature extending lengthwise of said tubular member with its inner end inwardly of the open end of said tubular member and with its outer end outwardly of said base member, leaf spring means pivotally connecting said armature to said base assembly to provide for movement of said inner end of said armature transversely of said tubular member, a support mounted on said closed end of said tubular member, switch means mounted on said support above said closed end of said tubular member, a pivotally mounted trip lever for said switch means, said switch actuating means including a plate member pivotally mounted on said support below said switch means, a spring at one end of said plate member for engaging one end of said trip lever, and a magnet below said spring disposed externally of said tubular member opposite the inner end of said armature and above the opening in said wall of said housing, a second spring between the other end of said plate member and said support for biasing said plate member in a direction to move said magnet away from said armature, and said second spring upon movement of the inner end of said armature in a direction away from said magnet effecting movement of said plate member to engage said first spring with said trip lever to trip said switch means.

8. In a device of the class described the combination of a housing having an opening in a wall thereof, a base assembly comprising a non-magnetic tubular member open at one end and closed at its other end, said base assembly being mounted on said wall of said housing to close the opening therein and with the closed end of said tubular member extending into said housing, switch actuating means including an armature extending lengthwise of said tubular member with its inner and outer ends being disposed inwardly and outwardly of the open end of said tubular member, respectively, spring means pivotally connecting said armature to said base assembly to provide for movement of said inner end of said armature transversely of said tubular member, adjustable spring biasing means mounted in said base assembly engaging said armature, switch means mounted within said housing in spaced relation to the closed end of said tubular member, said switch actuating means including a plate member for tripping said switch means pivotally mounted in said housing and having a magnet mounted thereon externally of said tubular member opposite the inner end of said armature and above the opening in said wall of said housing, means for normally biasing said plate member in a direction to move said magnet away from said armature, and said last named means upon movement of the inner end of said armature in a direction away from said magnet effecting movement of said plate member to trip said switch means.

9. In a flow device adapted to be responsive to the flow of liquid in pipe line or the like the combination of a housing having an opening in the wall thereof, a base assembly comprising a base member having a passageway extending therethrough, and a tubular member opened at one end and closed at its other end and having its open end in communication with the passageway of said base member, said base assembly being mounted on said wall of said housing to close the opening therein with the passageway of said base member in communication with the interior of said pipe line, and with the closed end of said tubular member extending into said housing, switch means in said housing, switch actuating means for tripping said switch means including an operating member extending lengthwise of said tubular member and having a paddle member adapted to be disposed in the path of the liquid in said pipe line, and spring means for mounting said operating member for movement in said tubular member responsive to flow of liquid in said pipe line.

10. In a float device having a float responsive to the level of liquid in a float chamber the combination of a housing having an opening in the wall thereof, a base assembly comprising a base member having a passageway extending therethrough, and a tubular member open at one end and closed at its other end and having its open end in communication with the passageway of said base member, said base assembly being mounted on said wall of said housing to close the opening therein with the passageway of said base member in communication with the interior of said float chamber, and with the closed end of said tubular member extending into said housing, switch means in said housing, switch actuating means for tripping said switch means including an operating member extending lengthwise of said tubular member, pivot means for mounting said operating member for movement in said tubular member transverse to the longitudinal axis thereof, and means connecting said float with said pivot means for effecting movement of said operating member responsive to movement of said float in said float chamber.

11. In a float device having a float movable vertically in response to the level of liquid in a float chamber the combination of a housing having an opening in the wall thereof, a base assembly comprising a base member having a passageway extending therethrough, and a tubular member opened at one end and closed at its other end and having its opened end in communication with the passageway of said base member, said base assembly being mounted on said wall of said housing to close the opening therein with the passageway of said base member in communication with the interior of said float chamber, and with said tubular member extending vertically into said housing with its closed end disposed within said housing, switch means in said housing, switch actuating means for tripping said switch means including an operating member extending lengthwise of said tubular member, spring pivot means mounting said operating member on said base assembly for movement of the inner end of said operating member transversely of the longitudinal axis of said tubular member, and means connecting said float with said pivot means for effecting transverse movement of said inner end of said operating member within said tubular member responsive to vertical movement of said float in said float chamber.

12. In a float device adapted to be responsive to the level of liquid in a float chamber or the like, the combination of a housing having an opening in a wall thereof, a base assembly for said housing adapted for connecting with said float chamber, said base assembly comprising a base member having a passageway extending therethrough, and a non-magnetic tubular member open at one end and closed at its other end and having its open end in communication with the passageway of said base member, said base assembly being mounted on said wall of said housing to close the opening therein with the passageway of said base member in communication with the interior of said float chamber, and with the closed end of said tubular member extending into said housing, switch actuating means including an armature extending lengthwise of said tubular member with its inner end disposed inwardly of the open end of said tubular member, first spring means pivotally connecting said armature to said assembly to provide for movement of said inner end of said armature transversely of the longitudinal axis of said tubular member, switch means mounted within said housing in spaced relation to the closed end of said tubular member, said switch actuating means including a plate member for tripping said switch means pivotally mounted in said housing and having a magnet disposed externally of said tubular member opposite the inner end of said armature and above the opening in said wall of said housing, second spring means for normally biasing said plate member in a direction to move said magnet away from said armature, means connecting said float with said first spring means for effecting transverse movement of said inner end of said armature responsive to the level of liquid in said float chamber, and said second spring means upon movement of said inner end of said armature in a direction away from said magnet effecting movement of said plate member to trip said switch means.

References Cited in the file of this patent
UNITED STATES PATENTS

| | | |
|---|---|---|
| 2,142,680 | Shrode | Jan. 3, 1939 |
| 2,310,504 | Aubert | Feb. 9, 1943 |
| 2,842,150 | Olson | July 8, 1958 |
| 2,887,546 | Hatfield et al. | May 19, 1959 |
| 2,952,753 | Kmiecik et al. | Sept. 13, 1960 |